US011942293B2

(12) United States Patent
Manev et al.

(10) Patent No.: US 11,942,293 B2
(45) Date of Patent: Mar. 26, 2024

(54) SYSTEM FOR CONTROLLING A VACUUM INTERRUPTER FOR A POWER DIVERTER SWITCH, A POWER DIVERTER SWITCH AND AN ON-LOAD TAP CHANGER

(71) Applicant: Hitachi Energy Ltd, Zurich (CH)

(72) Inventors: Georgi Manev, Sofia (BG); Borislav Vasilev, Sofia (BG); Todor Kokev, Sofia (BG)

(73) Assignee: Hitachi Energy Ltd, Zurich (CH)

(*) Notice: Subject to any disclaimer, the term of this patent is extended or adjusted under 35 U.S.C. 154(b) by 0 days.

(21) Appl. No.: 18/023,458

(22) PCT Filed: Aug. 24, 2021

(86) PCT No.: PCT/EP2021/073380
§ 371 (c)(1),
(2) Date: Feb. 27, 2023

(87) PCT Pub. No.: WO2022/089809
PCT Pub. Date: May 5, 2022

(65) Prior Publication Data

US 2023/0230786 A1 Jul. 20, 2023

(30) Foreign Application Priority Data

Oct. 26, 2020 (EP) .................................... 20203858

(51) Int. Cl.
*H01H 33/666* (2006.01)
*H01H 9/00* (2006.01)

(52) U.S. Cl.
CPC ........ *H01H 33/666* (2013.01); *H01H 9/0038* (2013.01); *H01H 2033/6667* (2013.01)

(58) Field of Classification Search
CPC .. H01H 9/0038; H01H 9/0033; H01H 9/0005; H01H 9/0016; H01H 3/44; H01H 33/666; H01H 2033/6667
(Continued)

(56) References Cited

U.S. PATENT DOCUMENTS 5,594,223 A * 1/1997 Fukushi ............... H01H 9/0038 218/120
6,060,669 A * 5/2000 Dohnal ................ H01H 9/0033 200/11 TC
(Continued)

FOREIGN PATENT DOCUMENTS

AU 1075583 A 8/1983
CN 201359912 Y 12/2009
(Continued)

OTHER PUBLICATIONS

Translation of CN110189937 (Original document published Aug. 30, 2019) (Year: 2019).*
(Continued)

*Primary Examiner* — William A Bolton
(74) *Attorney, Agent, or Firm* — Sage Patent Group

(57) ABSTRACT

A system for controlling a vacuum interrupter for a power diverter switch comprises a main driving shaft which is configured to drive the control cam. The system further comprises the vacuum interrupter which is configured to separate electrical contacts in a vacuum by use of a contact rod, and a transmission unit which is configured to transmit the force generated by the main driving shaft to the contact rod. The transmission unit comprises a plurality of rollable guiding elements and a lever mechanism which is coupled to both the control cam and the contact rod of the vacuum interrupter such that a rotation of the control cam generated by the main driving shaft causes a movement of the contact.

9 Claims, 3 Drawing Sheets

(58) Field of Classification Search
USPC ........................................ 218/118; 200/11 TC
See application file for complete search history.

(56) References Cited

U.S. PATENT DOCUMENTS

| | | | | |
|---|---|---|---|---|
| 8,330,063 | B2 * | 12/2012 | Xiao | H01H 9/0038 200/11 TC |
| 9,183,998 | B2 * | 11/2015 | Elick | H01H 3/30 |
| 9,543,096 | B2 * | 1/2017 | Bieringer | H02P 13/06 |
| 9,570,248 | B2 * | 2/2017 | Raith | H01H 9/0005 |
| 9,697,963 | B2 * | 7/2017 | Zwirglmaier | H01H 9/0033 |
| 10,102,990 | B2 * | 10/2018 | Wrede | H01H 9/0027 |
| 10,734,169 | B2 * | 8/2020 | Lammers | H01H 3/30 |
| 2015/0008104 | A1 | 1/2015 | Hoepfl et al. | |
| 2020/0168420 | A1 * | 5/2020 | Schmidt | H01H 9/0016 |
| 2021/0118630 | A1 * | 4/2021 | Herold | H01H 9/0038 |

FOREIGN PATENT DOCUMENTS

| | | | |
|---|---|---|---|
| CN | 101807469 | A | 8/2010 |
| CN | 101807469 | B | 1/2012 |
| CN | 102460623 | A | 5/2012 |
| CN | 102549695 | A | 7/2012 |
| CN | 204407244 | U | 6/2015 |
| CN | 109741989 | A | 5/2019 |
| CN | 10189937 | A | 8/2019 |
| CN | 111712893 | A | 9/2020 |
| EP | 2261935 | A1 | 12/2020 |
| JP | 2004039958 | A | 2/2004 |
| KR | 20180100242 | A | 9/2018 |
| KR | 10-2018-0127682 | A | 11/2018 |
| KR | 10-2020-0029047 | A | 3/2020 |
| WO | 2013174567 | A1 | 11/2013 |

OTHER PUBLICATIONS

International Search Report and Written Opinion of the International Searching Authority, PCT/EP2021/073380, dated Nov. 5, 2021, 14 pages.
Extended European Search Report, EP20203858.4, dated Mar. 29, 2021, 25 pages.
Notice of Grounds for Rejection, Korean Patent Application No. 10-2023-7007732, dated Jul. 20, 2023, 10 pages.
Decision to Grant, Korean Patent Application No. 10-2023-7007732, dated Nov. 14, 2023, 6 pages.
Notification of Grant, Chinese Patent Application No. 202180063240.4, dated Jan. 10, 2024, 7 pages.

* cited by examiner

SYSTEM FOR CONTROLLING A VACUUM INTERRUPTER FOR A POWER DIVERTER SWITCH, A POWER DIVERTER SWITCH AND AN ON-LOAD TAP CHANGER

CROSS REFERENCE TO RELATED APPLICATIONS

This application is a 35 U.S.C. § 371 national stage application of PCT International Application No. PCT/EP2021/073380 filed on Aug. 24, 2021, which in turn claims foreign priority to European Patent Application No. 20203858.4, filed on Oct. 26, 2020, the disclosures and content of which are incorporated by reference herein in their entirety.

BACKGROUND

The present disclosure is related to a system for controlling a vacuum interrupter for a power diverter switch. The present disclosure is further related to a corresponding power diverter switch and an on-load tap changer.

Vacuum interrupters are widely used in utility power transmission systems, power generation units and power-distribution systems for railways, for example. Document US 2015/008104 A1 discloses an on-load tap changer having at least two vacuum interrupters. The on-loader tap changer comprises a selector for selecting a respective winding tap of a tapped transformer, a load changeover switch for changing over from the connected winding tap to the respectively preselected winding tap, a rotatable drive shaft which is mechanically coupled to the selector, and a gear mechanism for operating a moving contact of a respective vacuum interrupter.

Document EP 2261935 A1 discloses a selector switch for switching taps of a transformer comprises a switching shaft insert including two switch contacts and a network terminal contact. Fixed step contacts are circumferentially arranged on a cylinder provided around the switching shaft insert, the fixed step contacts being connected to taps of the transformer.

The documents CN 101807469 B discloses a lever systems for driving a vacuum bubble. The system comprises a molded plastic baseplate on which the vacuum bubble is arranged through a connecting rod device. A lever device comprises a lever, a connecting rod, a supporting seat and a return spring, wherein the connecting rod is in threaded connection with a lower link rod of the vacuum bubble. The lever is hinged with the supporting seat.

The document CN 110189937 A discloses a double-fracture vacuum on-load tap-changer comprising a mounting flange at the upper end of the tap-changer for conveniently mounting the tap-changer. A tap-changer cylindrical body is disposed under the mounting flange and a change-over switch and a vacuum tube synchronous operating mechanism are installed in the tap-changer cylindrical body.

Therein, the vacuum interrupter realizes a switch of a medium-voltage circuit-breaker, generator circuit-breaker, or high-voltage circuit-breaker which uses electrical contacts in a vacuum to reliably separate the electrical contacts resulting in a metal vapour arc, which is quickly extinguished. In this respect, it is a challenge to provide stable and reliable mechanisms to transmit the motion from a driving cam to a contact rod of the vacuum interrupter to securely switch the electrical contacts.

SUMMARY

It is an object to provide a system for controlling a vacuum interrupter for a power diverter switch that enables secure and reliable switching of electrical contacts of the vacuum interrupter. It is a further object to provide a corresponding power diverter switch and an on-load tap changer including such a system.

These objects are achieved by the subject-matter of the independent claim. Further developments and embodiments are described in the dependent claims.

According to some embodiments, a system for controlling a vacuum interrupter for a power diverter switch comprises a main driving shaft which is coupled to a control cam and which is configured to drive the control cam. The system further comprises the vacuum interrupter which is configured to separate electrical contacts in a vacuum by use of a contact rod, and a transmission unit which is configured to transmit the force generated by the main driving shaft to the contact rod. The transmission unit comprises a plurality of rollable guiding elements and a lever mechanism which is in contact with the rollable guiding elements and which is coupled to both the control cam and the contact rod of the vacuum interrupter. The guiding elements each are configured to be rollable around a respective axis of rotation that is perpendicular to a longitudinal center axis of the vacuum interrupter such that a rotation of the control cam generated by the main driving shaft causes a movement of the contact rod due to a guided movement of the lever mechanism by means of rolling of the guiding elements.

By use of the described system a compact and simple design of mechanism for controlling of a vacuum interrupters (VI) in a diverter switch of an on-load tap-changer is feasible. Due to the rollable guiding elements the system enables a reliably directed movement of the contact rod and thus a secure separation of the electrical contacts of the VI.

It is a recognition of some embodiments herein that usual designs for control of a VI, used in diverter switches include various types of sliding guiders and auxiliary levers with hinges, which are driven by means of a cam. Such mechanisms requires the presence of a plurality of elements involved in the propulsion of the VI which reduces the reliability of such mechanisms in relation to the wear of these elements due to the sliding friction, in particular. Moreover, a dimensional chain of elements between the cam and the contact rod of the VI, with the presence of a plurality of elements lead to a complicated structure, which imposes high requirements for accuracy in their manufacture. In addition, more space is need to assemble and locate all elements and further there are dependencies due to hinges implemented in such mechanisms which deteriorate their performance at low temperatures.

The described system enables to counteract the aforementioned effects and contributes to a space-saving design of a mechanism with a clear structure and a small number of elements. Thus, it further contributes to ease the requirements for manufacturing accuracy and to reduce loss due to friction. For example, the plurality of rollable guiding elements includes guiding elements formed as rolling bearings, rolls and/or bushings. Thus, there is only rolling friction instead of sliding-friction in the described system.

According to an embodiment of the system the lever mechanism is configured to be hingeless comprising a t-shaped bushing including a cylindrical element and a lever connected thereto. The hingeless lever mechanism further comprises an upper and a lower guiding unit each comprising at least one guiding element arranged at an upper portion or a lower portion of the cylindrical element respectively with respect to a longitudinal axis of the cylindrical element. The lever mechanism further comprises a first lever driving element arranged between the control cam and the lever, wherein the cylindrical element is arranged to be in contact to the contact rod of the VI.

With respect to an operating state, the main driving shaft dives the control cam by means of pushing it towards the first lever driving element and the lever. Thus, the t-shaped bushing is moved and separation of the electrical contacts of the VI can be initiated. For instances, the first lever driving element is formed as a rolling bearing, a roller or a bushing realizing a driving element to move the lever, which is connected perpendicularly to the cylindrical element forming the t-shaped bushing.

According to a further embodiment of the system the upper and lower guiding unit each comprises at least two rollable guiding elements arranged at opposite sides of the cylindrical element with respect to the longitudinal axis of the cylindrical element and with respect to a plane spanned by the longitudinal axis of the cylindrical element and a longitudinal axis of the main driving shaft. Such a configuration enables a stable and reliable guidance of the cylindrical element in the aforementioned plane, in particular. Thus, a movement of the contact rod and separation of the electrical contacts of the VI can initiated securely.

According to some further embodiments of the system the upper and lower guiding unit each comprise four guiding elements arranged perpendicularly to adjacent ones with respect to the longitudinal axis of the cylindrical element. Such a configuration contributes to a very reliable and safe guidance of the cylindrical element and movement of the contact rod.

According to some further embodiments of the system the lever mechanism further comprises guiding pins and a second lever driving element formed as a rolling bearing, a roller or a bushing arranged between the control cam and the lever and between the guiding pins respectively. Thus, the developed lever mechanism is configured to further prevent unwanted rotation of the contact rod around its axis.

According to some embodiments a power diverter switch for an on-load tap changer comprises an insulating plate, a supporting plate, and an embodiment of the described system, which is coupled to both the insulating plate and the supporting plate, in between for example. Such a configuration indicates an example possibility to arrange the system inside a power diverter switch. However, there are also alternative possibilities to arrange the system in the power diverter switch. For instance the system can also be arranged outside the insulating plate and/or the supporting plate. The power diverter switch for an on-load tap changer comprises an insulating plate, a supporting plate and an embodiment of the described system, respectively.

According to some embodiments an on-load tap changer for setting a gear ratio comprises an embodiment of the aforementioned power diverter switch.

Such a configuration of a power diverter switch and an on-load tap changer using some embodiments of the described system for controlling a VI enables secure and reliable switching of electrical contacts of the VI. As a result of that the power diverter switch and the on-load tap changer comprises some embodiments of the system as described above, described features and characteristics of the system are also disclosed with respect to the power diverter switch and the on-load tap changer and vice versa.

The described system and the corresponding power diverter switch and on-load tap changer include a simple driving mechanism for the VI and for example without any hinges, in which the contact rod of the VI is guided straight between the rollable guiding elements which are formed as two sets of four rolling bearings or rollers, for instances. Such a configuration makes it possible for the point of application of the force needed to open the VI to be displaced away from its longitudinal axis. The control cam acts on a bearing or roll or bushing that is mounted on or around the cylindrical element which realizes a guided part on which the lever is arranged perpendicularly, for example.

The described system and the mechanism of the transmission unit contributes to an advantageous structure due to a simple way of actuating the contact rod—directly, without any additional elements and corresponding unwanted gaps and unwanted wear in hinges, for example. There is only rolling friction in such a mechanism and such a configuration is suitable in particular when a distance between the longitudinal axis of the VI and the longitudinal axis of the main driving shaft should be kept small. Furthermore, due to the fact that the lever mechanism can be configured hingeless an adverse influence of low temperatures can be reduced as well. Thus, using the described system with a hingeless lever mechanism enables reliable functioning even at temperatures of −40° C. up to 105° C. of oil used inside the system, for example.

BRIEF DRAWING DESCRIPTION

Example embodiments of the invention are explained in the following with the aid of schematic drawings and reference numbers. The figures show:

Identical reference numbers designate elements or components with identical functions. In so far as elements or components correspond to one another in terms of their function in different figures, the description thereof is not repeated for each of the following figures. For the sake of clarity elements might not appear with corresponding reference symbols in all figures possibly.

DETAILED DESCRIPTION

Figure 1:
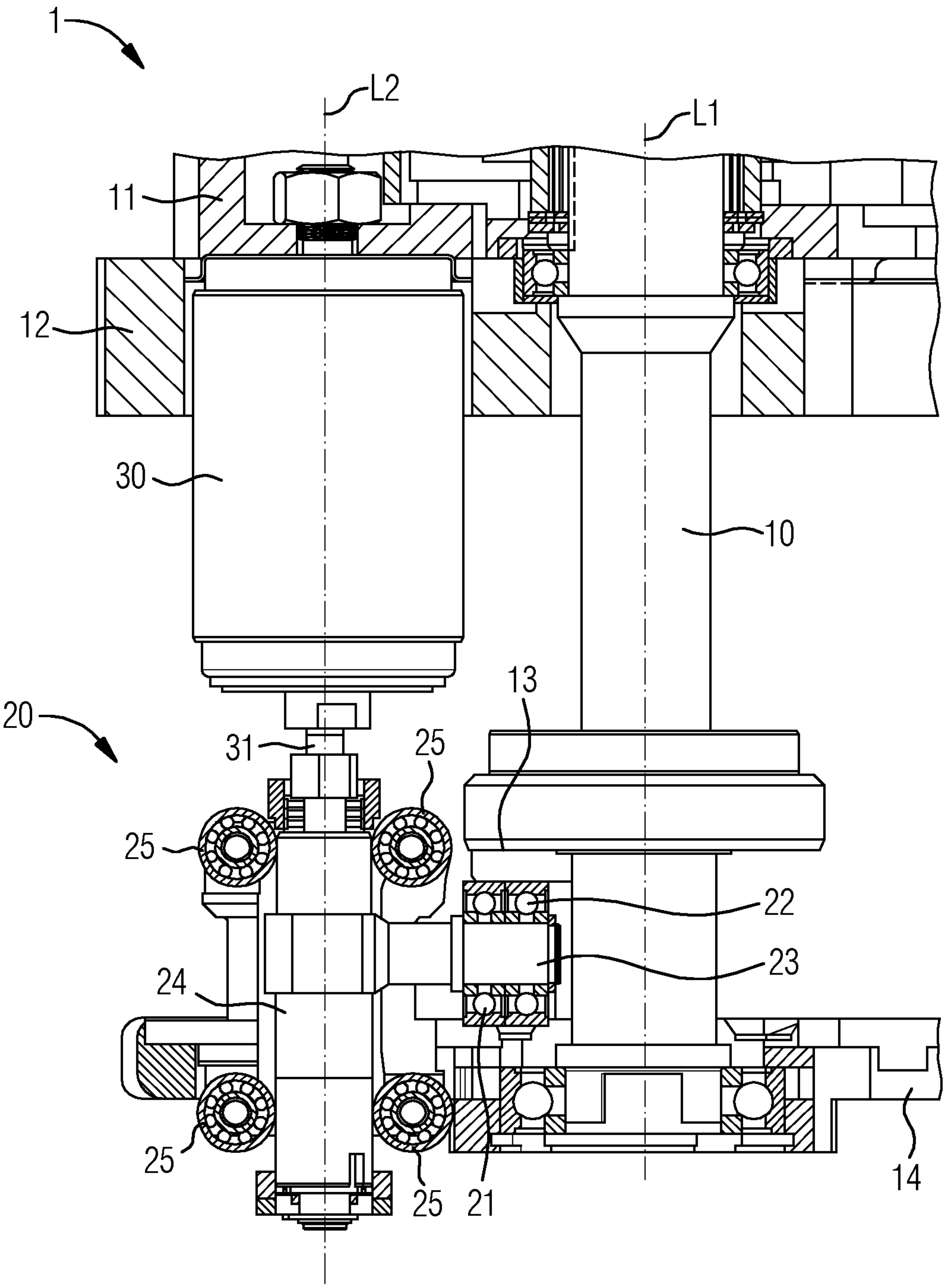
FIG. 1 illustrates an example embodiment of a system for controlling a vacuum interrupter for a power diverter switch in a side view.
Figure 2:
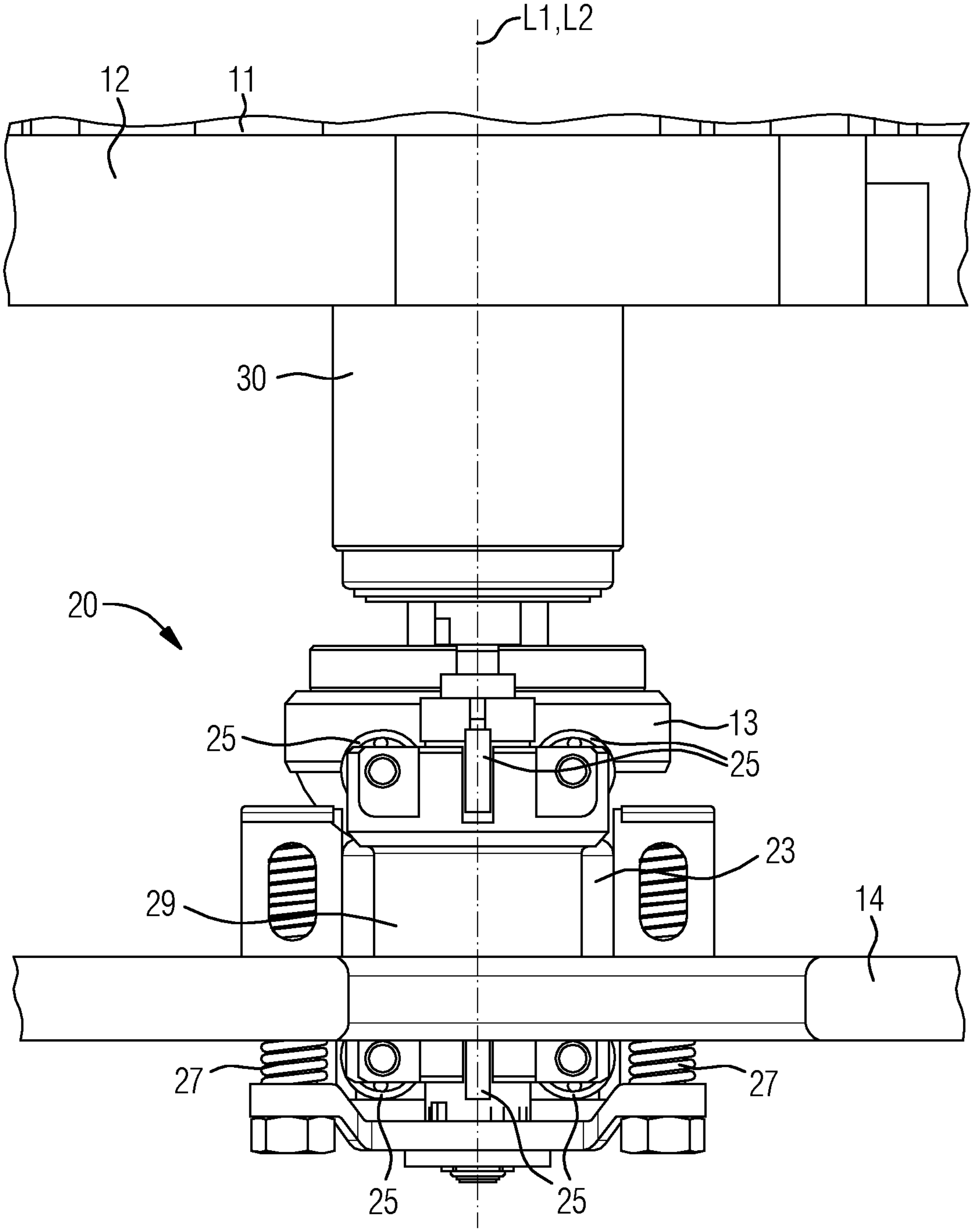
FIG. 2 illustrates the system of FIG. 1 in another side view.
Figure 3:
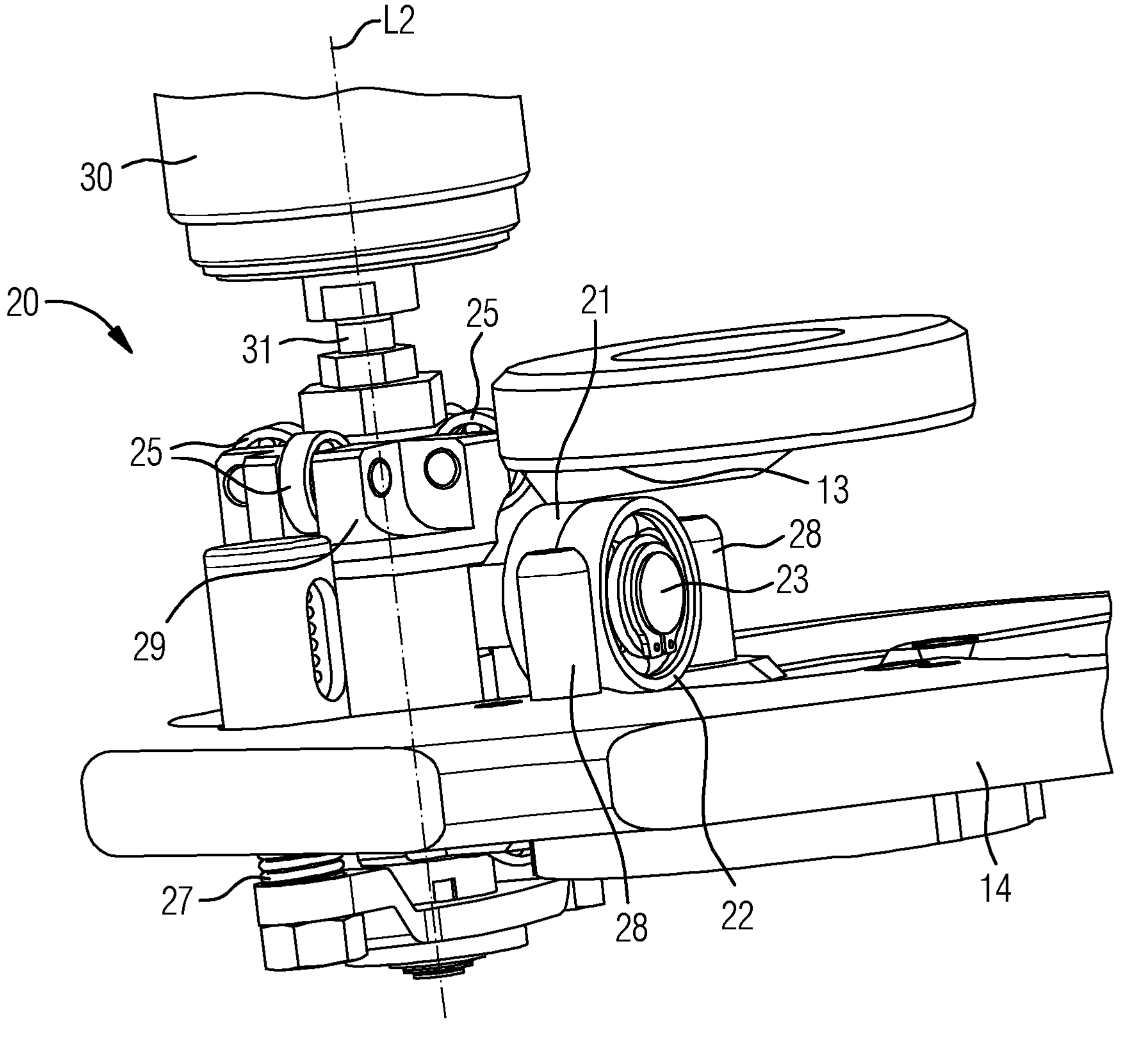
FIG. 3 illustrates components of the system of the FIGS. 1 and 2 in a perspective view.

FIG. 1 illustrates a side view of an embodiment of a system 1 for controlling a vacuum interrupter 30 of a power diverter switch. FIG. 2 illustrates another side view of the system 1 and FIG. 3 shows a perspective view of some components of the system 1.

The system 1 includes a main driving shaft 10 which is coupled to a control cam 13 and which is configured to drive the control cam 13. The vacuum interrupter (VI) 30 which is configured to separate electrical contacts in a vacuum by use of a contact rod 31. A transmission unit 20 which is configured to transmit the force generated by the main driving shaft 10 to the contact rod 31. The transmission unit 20 comprises a plurality of rollable guiding elements and a lever mechanism 21, 22, 23, 24 which is coupled to both the control cam 13 and the contact rod 31 of the vacuum interrupter 30. The guiding elements are formed as rolling bearings 25. Thus, a rotation of the control cam 13 generated by the main driving shaft 10 causes a movement of the contact rod 31 due to a guided movement of the lever mechanism 21, 22, 23, 24 by means of rolling of the bearings 25.

The system 1 realizes a component of a power diverter switch for an on-load tap changer. The diverter switch further comprises a lower supporting steel plate 14 and an upper insulating plate 12 on which is mounted a stationary contact board 11, carrying the VI 30. The control cam 13 is fastened to the main driving shaft 10.

The lever mechanism of the transmission unit 20 comprises a cylindrical element 24 and a lever 23 perpendicularly connected thereto. The cylindrical element 24 is further connected to the contact rod 31 of the VI 30. The cylindrical element 24 is guided by two groups of rolling bearings 25 distanced one above the other forming an upper and a lower guiding unit of guiding elements. According to the illustrated embodiments, each group consists of four bearings 25 located at an angle of approximately 90° relative to each other with respect to a central axis L2 of the cylindrical element 24 and/or the VI 30. Thus, the illustrated embodiment of the system 1 comprises eight rolling bearings 25 to provide stable and reliable guidance. Thus, with respect to the central axis L2 the transmission unit 20 counteracts an unwanted tilt of the cylindrical element 24 and contributes to a secure and reliable movement of the contact rod 31 and separation of the electrical contacts of the VI 30.

The bearings 25 are mounted on a stationary hollow holder 29 with a slot on one side, in which the perpendicular lever 23 can move. The system 1 comprises two further bearings which are mounted on the lever 23 and which realize a first lever bearing 21 and a second lever bearing 22. The control cam 13 is a specially shaped cylindrical cam and is configured to act on the first lever bearing 21 by applying a force parallel to the central axis L2 of the VI 30. The second lever bearing 22 is configured to move between two guiding pins 28 with a relative small gap such that the second lever bearing 22 touches only one guiding pin 28 or the other (see FIG. 3). Alternatively, the guiding pins 28 and the second lever bearing 22 can be arranged at the opposite side of the cylindrical element 24, for example, with respect to the central axis L2 interacting with an elongated lever 23. Such a mechanism respectively enables to prevent unwanted rotation of the contact rod 31 around its axis which corresponds to the central axis L2.

Moreover, in order to contribute to a space-saving design of the system 1 two contact springs 27 are placed on both sides of the stationary holder 29 with the bearings 25. These contact springs 27 are driven by the contact rod 31 using a common strap (see FIG. 2).

The described system 1 provides a reliable mechanism for direct control of the vacuum interrupter 30 in the power diverter switch for an on-load tap changer. The structure of the system 1 is clear and enables a simple driving mechanism for the VI 30 without any hinges, due to the described structure of the transmission unit 20. The contact rod 31 of the VI 30 is guided straight between the two sets of four rolling bearings 25, which can be formed as rollers and/or bushings alternatively. Thus, it is possible for the point of application of the force needed to open the VI 30 to be displaced away from its longitudinal axis L2.

The main driving shaft drives the control cam 13 which acts on the first lever bearing 21 that is mounted on the cylindrical guided part realized by the cylindrical element 24 with perpendicular lever 23. Such a mechanism enables a simple but reliable way of actuating the contact rod 31—directly, without any additional elements with the corresponding unwanted gaps and unwanted wear in hinges, for example. There is only rolling friction and no friction in sliding present in this mechanism due to the rollable guiding elements and the hingeless lever mechanism. The described rollable bearings 25 beneficially operate using a small predetermined gap between the bearings 25 and the cylindrical element 24 such that there is a slight guiding contact to one of the upper and/or lower bearings 25, at least.

In particular, such a system 1 is suitable when an interaxial distance between the central axis L2 of the VI 30 and a central axis L1 of the main driving shaft 10 must be minimal or relatively small. Moreover, due to the possibility of saving hinges the influence of low temperatures is reduced as well because hinges deteriorate their performance at low temperatures around −20° C. to −40° C., for example.

REFERENCE NUMERALS

1 system for controlling a vacuum interrupter
10 main driving shaft
11 stationary contact board
12 insulating plate
13 control cam
14 supporting plate
20 transmission unit
21 first lever bearing
22 second lever bearing
23 lever
24 cylindrical element
25 rolling bearing
26 stationary holder
27 contact spring
28 guiding pin
29 stationary holder
30 vacuum interrupter
31 contact rod
L2 longitudinal axis of the main driving shaft
L2 longitudinal axis of the cylindrical element/vacuum interrupter

The invention claimed is:

1. A system for controlling a vacuum interrupter for a power diverter switch, comprising:

a main driving shaft which is coupled to a control cam and which is configured to drive the control cam, the vacuum interrupter which is configured to separate electrical contacts in a vacuum by use of a contact rod, and a transmission unit which is configured to transmit a force generated by the main driving shaft to the contact rod, wherein the transmission unit comprises a plurality of rollable guiding elements and a lever mechanism which is in contact with the rollable guiding elements and which is coupled to both the control cam and the contact rod of the vacuum interrupter, wherein the guiding elements each are configured to be rollable around a respective axis of rotation that is perpendicular to a longitudinal center axis of the vacuum interrupter, such that a rotation of the control cam generated by the main driving shaft causes a movement of the contact rod due to a guided movement of the lever mechanism by means of rolling of the guiding elements, wherein the lever mechanism further comprises guiding pins and a second lever driving element formed as a rolling bearing, a roller or a bushing arranged between the control cam and the lever and between the guiding pins respectively.

2. The system according to claim 1, wherein the plurality of rollable guiding elements includes guiding elements formed as rolling bearings, rolls and/or bushings.

3. A system for controlling a vacuum interrupter for a power diverter switch, comprising:

a main driving shaft which is coupled to a control cam and which is configured to drive the control cam, the vacuum interrupter which is configured to separate electrical contacts in a vacuum by use of a contact rod, and a transmission unit which is configured to transmit a force generated by the main driving shaft to the contact rod, wherein the transmission unit comprises a plurality of rollable guiding elements and a lever mechanism which is in contact with the rollable guiding elements and which is coupled to both the control cam and the contact rod of the vacuum interrupter, wherein the guiding elements each are configured to be rollable around a respective axis of rotation that is perpendicular to a longitudinal center axis of the vacuum interrupter, such that a rotation of the control cam generated by the main driving shaft causes a movement of the contact rod due to a guided movement of the lever mechanism by means of rolling of the guiding elements, wherein the lever mechanism is configured to be hingeless comprising:

a t-shaped bushing including a cylindrical element and a lever connected to the cylindrical element, wherein the cylindrical element is arranged to be in contact to the contact rod, an upper and a lower guiding unit each comprising at least one guiding element arranged at an upper portion or a lower portion of the cylindrical element respectively with respect to the longitudinal axis of the cylindrical element, and a first lever driving element arranged between the control cam and the lever.

4. The system according to claim 3, wherein the first lever driving element is formed as a rolling bearing, a roller or a bushing.

5. The system according to claim 3, wherein the upper and lower guiding unit each comprising two guiding elements arranged at opposite sides of the cylindrical element with respect to the longitudinal axis of the cylindrical element and with respect to a plane spanned by the longitudinal axis of the cylindrical element and a longitudinal axis (L1) of the main driving shaft.

6. The system according to claim 3, wherein the upper and lower guiding unit each comprising four guiding elements arranged perpendicularly to adjacent ones with respect to the longitudinal axis of the cylindrical element.

7. The system according to claim 3, wherein the plurality of rollable guiding elements includes guiding elements formed as rolling bearings, rolls and/or bushings.

8. A power diverter switch for an on-load tap changer, comprising:

an insulating plate, a supporting plate, and a system for controlling a vacuum interrupter for the power diverter switch, comprising:

a main driving shaft which is coupled to a control cam and which is configured to drive the control cam, the vacuum interrupter which is configured to separate electrical contacts in a vacuum by use of a contact rod, and a transmission unit which is configured to transmit a force generated by the main driving shaft to the contact rod, wherein the transmission unit comprises a plurality of rollable guiding elements and a lever mechanism which is in contact with the rollable guiding elements and which is coupled to both the control cam and the contact rod of the vacuum interrupter, wherein the guiding elements each are configured to be rollable around a respective axis of rotation that is perpendicular to a longitudinal center axis of the vacuum interrupter, such that a rotation of the control cam generated by the main driving shaft causes a movement of the contact rod due to a guided movement of the lever mechanism by means of rolling of the guiding elements, which is coupled to both the insulating plate and the supporting plate.

9. The on-load tap changer for setting a gear ratio, comprising:

the power diverter switch according to claim 8.

* * * * *